(12) United States Patent
Ishizu

(10) Patent No.: US 12,177,610 B2
(45) Date of Patent: Dec. 24, 2024

(54) ELECTRONIC APPARATUS PROVIDED WITH COMMUNICATION FUNCTION, METHOD OF CONTROLLING THE SAME, AND STORAGE MEDIUM

(71) Applicant: CANON KABUSHIKI KAISHA, Tokyo (JP)

(72) Inventor: Akihiko Ishizu, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 109 days.

(21) Appl. No.: 18/119,418

(22) Filed: Mar. 9, 2023

(65) Prior Publication Data
US 2023/0300298 A1    Sep. 21, 2023

(30) Foreign Application Priority Data

Mar. 18, 2022 (JP) .................................. 2022-044385

(51) Int. Cl.
*H04N 7/18* (2006.01)
*G06V 10/764* (2022.01)
*H04N 5/77* (2006.01)

(52) U.S. Cl.
CPC ........... *H04N 7/183* (2013.01); *G06V 10/764* (2022.01); *H04N 5/77* (2013.01)

(58) Field of Classification Search
CPC . G06F 21/6218; G06F 16/172; H04L 67/568; H04L 67/06; H04N 7/183; H04N 5/77; H04N 23/661; G06V 10/764
See application file for complete search history.

(56) References Cited

U.S. PATENT DOCUMENTS

| | | | |
|---|---|---|---|
| 6,073,168 A * | 6/2000 | Mighdoll | H04N 21/812 375/E7.129 |
| 6,438,589 B1 * | 8/2002 | Iwata | H04N 1/00416 719/310 |
| 6,509,900 B1 * | 1/2003 | Ohsawa | G06F 12/121 711/E12.07 |
| 10,116,719 B1 * | 10/2018 | Li | H04L 65/752 |
| 10,333,783 B2 | 6/2019 | Ishizu | |
| 10,616,336 B1 * | 4/2020 | Zelenov | H04L 67/06 |
| 12,032,516 B1 * | 7/2024 | Gathala | G06F 9/541 |
| 2009/0195662 A1 * | 8/2009 | Hirose | H04N 21/4113 348/207.99 |
| 2010/0332534 A1 * | 12/2010 | Chang | G06F 16/13 707/812 |

(Continued)

FOREIGN PATENT DOCUMENTS

JP      2007-310446 A     11/2007

*Primary Examiner* — Chiawei Chen
(74) *Attorney, Agent, or Firm* — VENABLE LLP

(57) ABSTRACT

An electronic apparatus in communication with an external apparatus generates an image list indicating images to be provided to the external apparatus and performs control such that the image list is transmitted to the external apparatus in a case where an obtainment request for the image list is received from the external apparatus. The electronic apparatus starts generating a cache of the image list after a predetermined operation pertaining to establishing communication with the external apparatus is made and before receiving the obtainment request for the image list, and transmits the image list based on the cache to the external apparatus in response to receiving the obtainment request.

14 Claims, 6 Drawing Sheets

(56) References Cited

U.S. PATENT DOCUMENTS

| | | | |
|---|---|---|---|
| 2013/0010133 A1* | 1/2013 | Fujita | H04N 5/765 |
| | | | 348/207.11 |
| 2014/0108465 A1* | 4/2014 | Chang | G06F 16/1847 |
| | | | 707/802 |
| 2014/0279873 A1* | 9/2014 | Somerfield | G06F 16/172 |
| | | | 707/610 |
| 2015/0120869 A1* | 4/2015 | Watanabe | H04W 4/00 |
| | | | 709/217 |
| 2015/0195338 A1* | 7/2015 | Myerscough | H04L 67/56 |
| | | | 709/203 |
| 2016/0006836 A1* | 1/2016 | LeFaucheur | H04L 67/55 |
| | | | 709/203 |
| 2016/0210016 A1* | 7/2016 | Shin | H04N 21/41407 |
| 2018/0324075 A1* | 11/2018 | Kawai | H04L 67/02 |
| 2019/0014226 A1* | 1/2019 | Osuka | H04W 76/14 |
| 2023/0115108 A1 | 4/2023 | Ishizu | |

\* cited by examiner

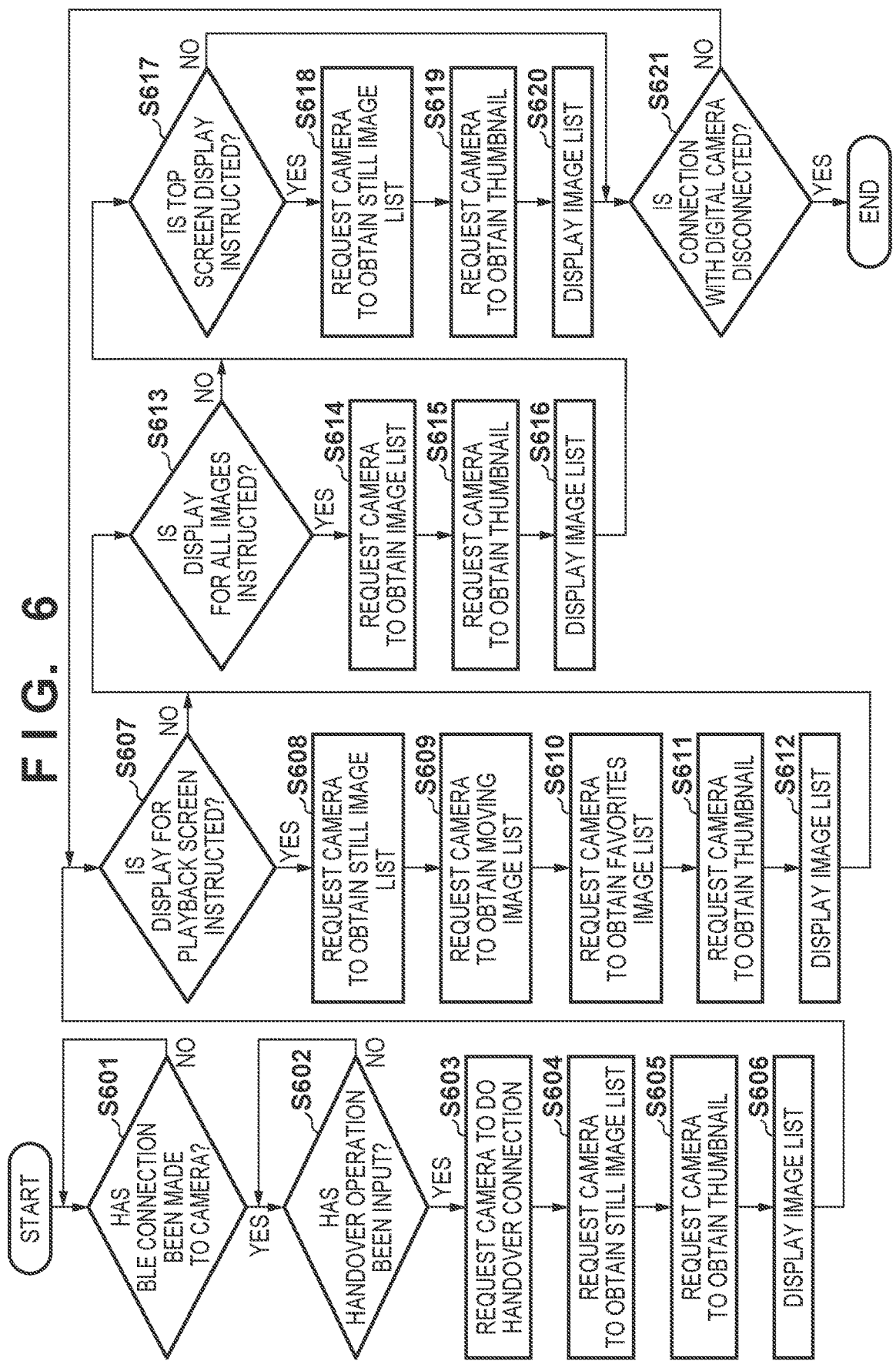

ELECTRONIC APPARATUS PROVIDED WITH COMMUNICATION FUNCTION, METHOD OF CONTROLLING THE SAME, AND STORAGE MEDIUM

BACKGROUND OF THE INVENTION

Field of the Invention

The present invention relates to an electronic apparatus provided with a communication function, a method of controlling the same, and a storage medium.

Description of the Related Art

In recent years, techniques are known in which data, such as images and the like held by an electronic apparatus such as a digital camera, is transmitted to an information processing apparatus such as a smart device through communication using a wireless Local Area Network (LAN) or the like, and the data is displayed on the information processing apparatus side. To display a list of images held by the electronic apparatus on the information processing apparatus side, a list of data may be transmitted from the electronic apparatus to the information processing apparatus, but if the electronic apparatus holds a large number of images, generating the list may take time.

Japanese Patent Laid-Open No. 2007-310446 proposes a technique in which, when a list to be transmitted to an external apparatus spans multiple pages, a server apparatus transmits a list of target pages requested by the external apparatus, and also generates a list by reading ahead pages aside from the target pages.

In the technique proposed in Japanese Patent Laid-Open No. 2007-310446, the server apparatus starts generating a list in response to receiving a request to generate a list. There is thus an issue in that it takes time to generate the first list requested by the external apparatus (i.e., the list of target pages).

SUMMARY OF THE INVENTION

The present disclosure has been made in consideration of the aforementioned issue, and realizes a technique capable of providing a rapid response to a request from an external apparatus for information provided by an electronic apparatus.

In order to solve the aforementioned issues, one aspect of the present disclosure provides an electronic apparatus comprising: a communication interface configured to communicate with an external apparatus; one or more processors; and a memory storing instructions which, when the instructions are executed by the one or more processors, cause the electronic apparatus to function as: a generation unit configured to generate an image list indicating images to be provided to the external apparatus; and a control unit configured to perform control such that the image list is transmitted to the external apparatus in a case where an obtainment request for the image list is received from the external apparatus, wherein the control unit starts generating a cache of the image list after a predetermined operation pertaining to establishing communication with the external apparatus is made and before receiving the obtainment request for the image list from the external apparatus, and transmits the image list based on the cache to the external apparatus in response to receiving the obtainment request for the image list.

Another aspect of the present disclosure provides a method of controlling an electronic apparatus that includes a communication interface configured to communicate with an external apparatus and a generation unit configured to generate an image list indicating images to be provided to the external apparatus, the method comprising: starting generation of a cache of the image list after a predetermined operation pertaining to establishing communication with the external apparatus is made and before receiving an obtainment request for the image list from the external apparatus; and performing control to transmit the image list based on the cache to the external apparatus in response to the obtainment request for the image list being received from the external apparatus.

Still another aspect of the present disclosure provides, a non-transitory computer-readable storage medium comprising instructions for performing the method of controlling an electronic apparatus that includes a communication interface configured to communicate with an external apparatus and a generation unit configured to generate an image list indicating images to be provided to the external apparatus, the method comprising: starting generation of a cache of the image list after a predetermined operation pertaining to establishing communication with the external apparatus is made and before receiving an obtainment request for the image list from the external apparatus; and performing control to transmit the image list based on the cache to the external apparatus in response to the obtainment request for the image list being received from the external apparatus.

According to the present invention, a rapid response can be provided to a request from an external apparatus for information provided by an electronic apparatus.

Further features of the present invention will become apparent from the following description of exemplary embodiments (with reference to the attached drawings).

BRIEF DESCRIPTION OF THE DRAWINGS

FIG. 6 is a flowchart illustrating a series of operations in image obtainment processing by the smart device according to the embodiment.

DESCRIPTION OF THE EMBODIMENTS

Figure 1:
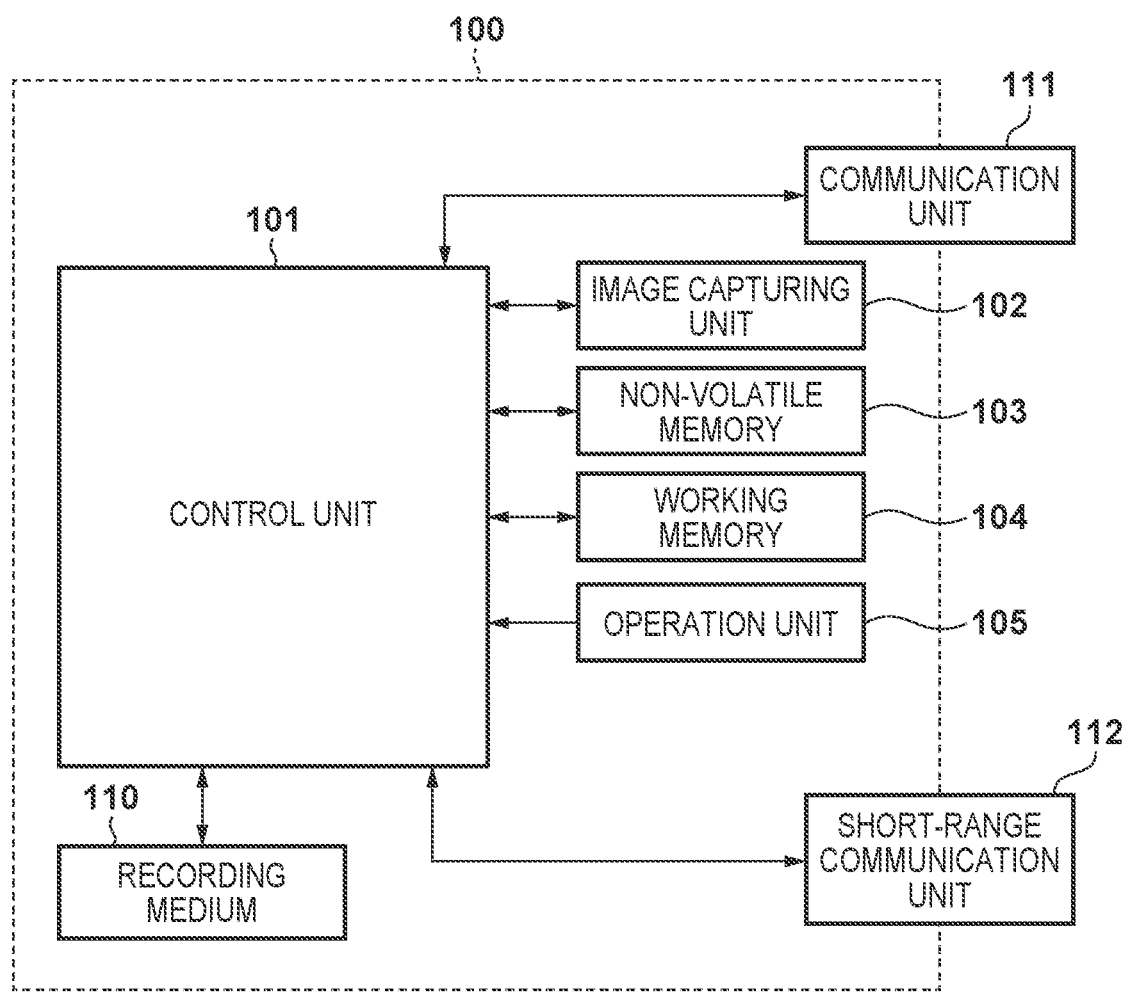
FIG. 1 is a block diagram illustrating the configuration of a digital camera serving as an example of an electronic apparatus according to an embodiment of the present invention.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

Configuration of Digital Camera

An example of the configuration of a digital camera 100 serving as an example of an electronic apparatus according to the present embodiment will be described with reference to FIG. 1. Although the present embodiment will describe a case where the electronic apparatus is a digital camera, the electronic apparatus is not limited to a digital camera. For example, the electronic apparatus may be a portable media player, or what is known as a tablet device, a smartphone, a personal computer, a smart speaker, or the like. The following will describe a case where a smart device is used as an information processing apparatus as an example. Smart devices include mobile terminals such as smartphones and tablet devices. Note that the information processing apparatus is not limited to a smart device, and for example, the information processing apparatus may be a digital camera, a printer, a television, a personal computer, or the like having a wireless communication function.

A control unit 101 includes one or more processors, such as a CPU, for example, and controls the various parts of the digital camera 100 by executing programs (described later). Note that a plurality of pieces of hardware may control the overall apparatus by sharing processing rather than the control unit 101 controlling the overall apparatus.

An image capturing unit 102 is constituted by, for example, an optical system that controls an optical lens unit as well as aperture, zoom, and focus, an image sensor for converting light (an image) entering through the optical lens unit into an electrical image signal, and the like. A Complementary Metal Oxide Semiconductor (CMOS), a Charge Coupled Device (CCD), or the like is typically used as the image sensor. Under the control of the control unit 101, the image capturing unit 102 uses the image sensor to convert subject light, formed as an image by a lens included in the image capturing unit 102, into an electrical signal, carries out noise reduction processing and the like, and outputs digital data as image data. In the digital camera 100 according to the present embodiment, the image data is encoded by the control unit 101, and is recorded as a file into a recording medium 110 in accordance with the Design Rule for Camera Filesystem (DCF) standard.

A non-volatile memory 103 includes a non-volatile memory that can be electrically erased and recorded to, and stores programs and the like (described later) that are executed by the control unit 101. A working memory 104 includes a volatile memory, and is used as a buffer memory that temporarily stores the image data captured by the image capturing unit 102, an image display memory for a display unit 106, a work region for the control unit 101, and so on. The working memory 104 may hold a cache of image lists (described later).

An operation unit 105 receives instructions made to the digital camera 100 by a user. The operation unit 105 includes, for example, a power button through which the user instructs the power of the digital camera 100 to be turned on and off, a release switch for instructing a shot to be taken, and so on. Note that the release switch has SW1 and SW2 for detecting a pressing state in two steps. SW1 turns on when the release switch is put into what is known as a "half-pressed" state. An instruction for performing shooting preparations such as autofocus (AF) processing, automatic exposure (AE) processing, auto white balance (AWB) processing, flash pre-emission (EF) processing, and the like is received as a result. SW2 turns on when the release switch is put into what is known as a "fully-pressed" state. An instruction for taking a shot is received as a result.

The recording medium 110 can record a file of the image data output from the image capturing unit 102. The recording medium 110 may be configured to be removable from the digital camera 100, or may be built into the digital camera 100. In other words, it is sufficient for the digital camera 100 to be able to access the recording medium 110.

A communication unit 111 is an interface for communicating with an external apparatus. The digital camera 100 of the present embodiment can exchange data such as images with the external apparatus, which is a smart device 200 (described later) or the like, through the communication unit 111. For example, the image data generated by the image capturing unit 102 can be transmitted to the external apparatus through the communication unit 111. In the present embodiment, the communication unit 111 includes an interface for communicating with the external apparatus over what is known as a wireless LAN according to the IEEE 802.11 standard. The control unit 101 implements wireless communication with the external apparatus by controlling the communication unit 111.

A short-range communication unit 112 is constituted by, for example, an antenna for wireless communication, and a modulation/demodulation circuit and a communication controller for processing wireless signals. The short-range communication unit 112 outputs the modulated wireless signal from the antenna, and demodulates the wireless signal received by the antenna, which realizes short-range wireless communication according to the IEEE 802.15 standard (known as Bluetooth (registered trademark)). The Bluetooth (registered trademark) communication in the present embodiment can use, for example, Bluetooth (registered trademark) Low Energy ("BLE" hereinafter) version 4.0, which consumes little power. This Bluetooth (registered trademark) communication has a narrower range of communication than wireless LAN communication (i.e., has a shorter communication distance). Additionally, Bluetooth (registered trademark) communication is slower than wireless LAN communication. However, Bluetooth (registered trademark) communication uses less power than wireless LAN communication. The digital camera 100 according to the present embodiment can exchange data with the external apparatus via the short-range communication unit 112. For example, when a shooting command has been received from an external apparatus, the image capturing unit 102 is controlled to perform shooting operations, whereas when a command to exchange data through wireless LAN communication has been received, the communication unit 111 is controlled so as to start the wireless LAN communication.

Note that the communication unit 111 of the digital camera 100 in the present embodiment has an AP mode for operating as an access point in infrastructure mode, and a CL mode for operating as a client in infrastructure mode. By operating the communication unit 111 in CL mode, the digital camera 100 can operate as a CL device in infrastructure mode. When the digital camera 100 operates as a CL device, the digital camera 100 can join a network formed by a nearby AP device by connecting to the AP device. In addition, by operating the communication unit 111 in the AP mode, the digital camera 100 can operate as a simplified AP (hereinafter referred to as "simple AP") which is a kind of AP, but has limited functions. When the digital camera 100 operates as a simple AP, the digital camera 100 forms a network by itself. An apparatus in the vicinity of the digital camera 100 can recognize the digital camera 100 as an AP device and join a network formed by the digital camera 100. The AP mode and the CL mode can be selected by the user by operating the operation unit 105.

Note that the digital camera 100 of the present embodiment may be a simple AP that, while being a kind of AP, does not have a gateway function for transferring data received from the CL device to an Internet provider or the like. In this case, even if the digital camera 100 receives data from another apparatus that has joined the network formed by the digital camera 100, that data cannot be transferred to a network such as the Internet.

Configuration of Smart Device

Figure 2:
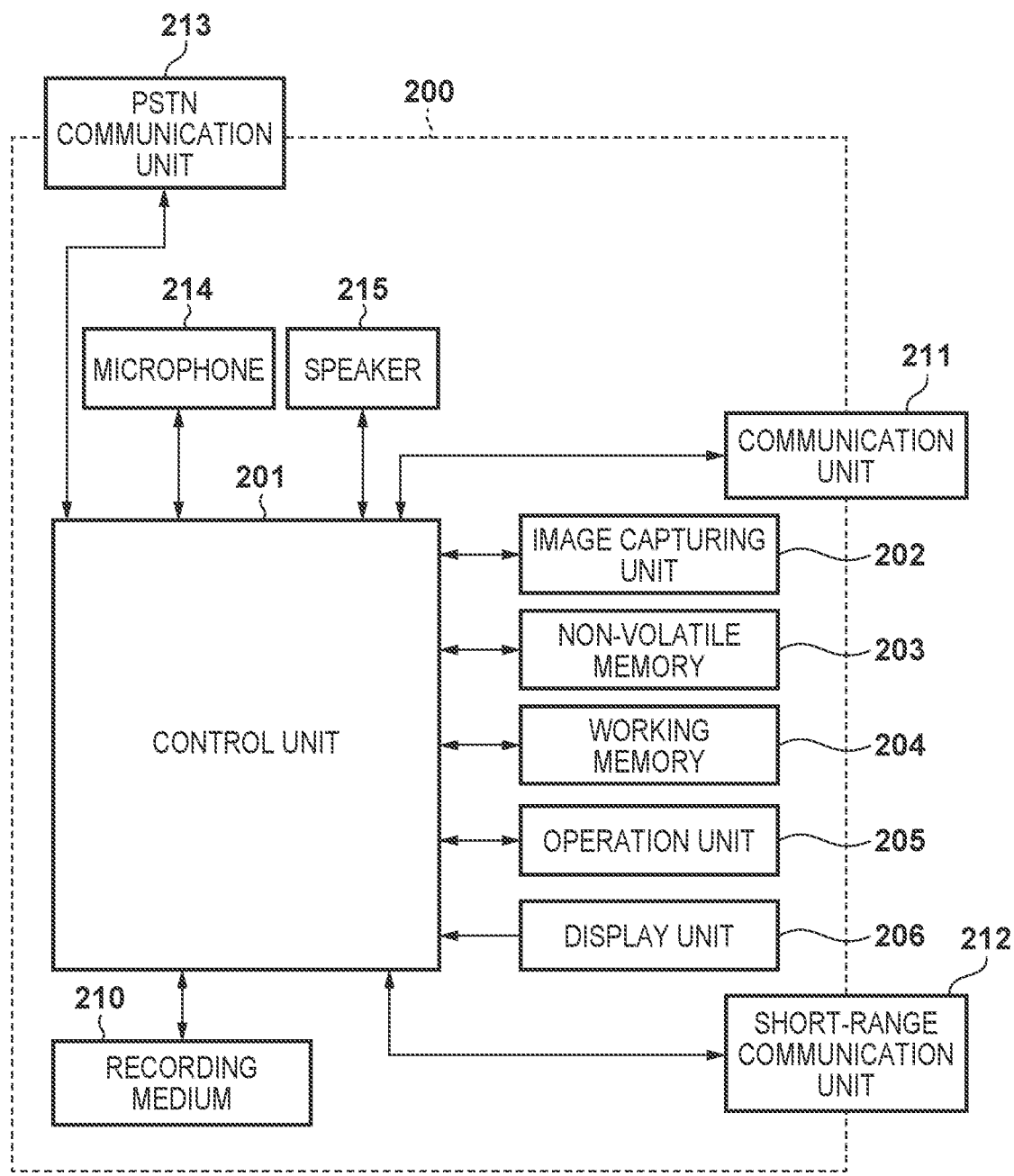
FIG. 2 is a block diagram illustrating an example of the configuration of a smart device serving as an example of an information processing apparatus according to the embodiment.

An example of the configuration of the smart device 200 serving as an example of an information processing apparatus according to the present embodiment will be described next with reference to FIG. 2.

A control unit 201 includes one or more processors, such as a CPU, for example, and controls the various parts of the smart device 200 by executing programs (described later). Note that a plurality of pieces of hardware may control the overall apparatus by sharing processing rather than the control unit 201 controlling the overall apparatus.

An image capturing unit 202 includes an optical system such as a lens and an image sensor, converts subject light, formed as an image by a lens included in the image capturing unit 202, into an electrical signal, carries out noise reduction processing and the like, and outputs digital data as image data. The captured image data is stored in a buffer memory, subjected to predetermined computations, encoding processing, and the like by the control unit 201, and is then recorded as a file into a recording medium 210.

A non-volatile memory 203 is a non-volatile memory that can be electrically erased and recorded to. For example, an operating system (OS), which is basic software executed by the control unit 201, applications that implement practical functions by operating cooperatively with the OS, and the like are recorded in the non-volatile memory 203. Additionally, in the present embodiment, an application ("app" hereinafter) for communicating with the digital camera 100, for example, is stored in the non-volatile memory 203.

A working memory 204 is used as an image display memory for a display unit 206, a work region for the control unit 201, and so on. An operation unit 205 is used for receiving instructions, made by the user in the smart device 200, from the user. The operation unit 205 includes operation members such as, for example, a power button through which the user instructs the power of the smart device 200 to be turned on and off, a touch panel formed on the display unit 206, and the like. The display unit 206 displays image data, text for interactive operations, and so on. Note that the smart device 200 does not absolutely need to include the display unit 206. It is sufficient for the smart device 200 to be capable of connecting to the display unit 206 and have at least a display control function for controlling the display in the display unit 206. Note that a user interface of the smart device 200 may be implemented by the operation unit 205 and the display unit 206.

The recording medium 210 can record image data output from the image capturing unit 202. The recording medium 210 may be configured to be removable from the smart device 200, or may be built into the smart device 200. In other words, it is sufficient for the smart device 200 to be able to access the recording medium 210.

A communication unit 211 is an interface for connecting to an external apparatus. The smart device 200 of the present embodiment can exchange data with the digital camera 100 through the communication unit 211. In the present embodiment, the communication unit 211 is an antenna, and the control unit 201 can connect to the digital camera 100 through the antenna. Note that the connection with the digital camera 100 may be a direct connection, or may be a connection made via an access point. HyperText Transfer Protocol (HTTP), for example, can be used as the protocol for communicating data. Alternatively, Picture Transfer Protocol over Internet Protocol (PTP/IP) over wireless LAN can be used instead. Note, however, that the communication with the digital camera 100 is not limited thereto. For example, the communication unit 211 can include an infrared communication module, a Bluetooth (registered trademark) communication module, a wireless communication module such as Wireless USB, or the like. Furthermore, a hard-wire connection such as a USB cable, HDMI (registered trademark), IEEE 1394, Ethernet, or the like may be employed.

A short-range communication unit 212 is a communication unit for implementing short-range wireless communication. The short-range communication unit 212 may include an antenna for wireless communication, and a modulation/demodulation circuit and a communication controller for processing wireless signals. The short-range communication unit 212 outputs the modulated wireless signal from the antenna, and demodulates the wireless signal received by the antenna, which realizes short-range wireless communication. Short-range wireless communication according to the IEEE 802.15 standard (what is known as "Bluetooth" (registered trademark)) is implemented here. Note that non-contact short-range communication implemented by the short-range communication unit 112 is not limited to Bluetooth (registered trademark), and another wireless communication type may be used.

A PSTN communication unit 213 is an interface used when carrying out public line wireless communication. The smart device 200 can make voice calls with other devices via the PSTN communication unit 213. At this time, the voice calls can be implemented by the control unit 201 inputting and outputting audio signals via a microphone 214 and a speaker 215. In the present embodiment, the PSTN communication unit 213 may include an antenna, and the control unit 101 can connect to a public network through the antenna. Note that the communication unit 211 and the PSTN communication unit 213 can also share a single antenna.

Example of Sequence for Transmitting Images Between Apparatuses

When displaying images held by the digital camera 100 in the smart device 200, the digital camera 100 first transmits a list of file paths of the images to the smart device 200 instead of transmitting the image data itself. Upon receiving access to the file paths from the smart device 200, the corresponding images are transmitted. In such a case, if the digital camera 100 holds a large number of images, it may take some time to generate the list of file paths. To solve this issue, in the present embodiment, the response speed when transmitting the list of the file paths of the images is improved by the digital camera 100 generating a cache of the list of the file paths of the images in advance.

An example sequence for transmitting images between the digital camera 100 and the smart device 200 according to the embodiment will be described hereinafter with reference to FIG. 3 and FIGS. 4A to 4D. Note that FIGS. 4A to 4D illustrate examples of a user interface (UI) displayed in the smart device 200 according to the embodiment. FIG. 4A illustrates the UI before the digital camera 100 and the smart device 200 are connected over the wireless LAN network. FIG. 4B illustrates the UI after the digital camera 100 and the smart device 200 are connected over the wireless LAN network. Note that in the descriptions of this processing, each of the digital camera 100 and smart device 200 will be described as the entity executing the corresponding processing, for the sake of simplicity. However, each instance of processing can be realized by the control unit 101 of the digital camera 100 and the control unit 201 of the smart device 200 each executing a program to control the operation of each constituent element illustrated in FIGS. 1 and 2.

In step S301, the digital camera 100 and the smart device 200 establish communication using BLE as an example of short-range wireless communication. BLE communication is slower than the communication over the wireless LAN network. As such, as will be described below, in the present embodiment, the obtainment of image lists, thumbnails, and the like, which requires high-speed communication, is performed over the wireless LAN network.

In step S302, once an operation for connecting to the wireless LAN network is performed through the operation unit 205, the smart device 200 makes a handover connection request to the digital camera 100 to connect over the wireless LAN network. In the present embodiment, for example, the application of the smart device 200 is launched as the operation for connecting to the wireless LAN network formed by digital camera 100. Doing so makes it possible for the user to connect to the digital camera 100 over the wireless LAN network and communicate at high speed simply by operating the smart device 200, without operating the digital camera 100. FIG. 4A illustrates a screen (UI) of the launched application, and 401 in FIG. 4A indicates a screen for displaying images such as still images shot by the digital camera 100. In the example indicated by the screen 401, the smart device 200 has not yet connected to the wireless LAN network formed by the digital camera 100 and has not yet obtained any images, and thus no images are displayed.

In step S303, the digital camera 100 transmits a response to the handover connection request to the smart device 200, and then disconnects the BLE communication. In step S304, the digital camera 100 activates an access point to function as a simple AP, and forms a wireless LAN network.

In step S305, the digital camera 100 starts generating a cache of a list of images. For example, the digital camera 100 selects images recorded in the recording medium 110, generates a cache of a list of images, and holds the generated image list cache in the working memory 104. In the present embodiment, there may be a plurality of lists of images to be cached. For example, the file paths of images and the number of images may be included for each of categories to be displayed in the smart device 200, such as "still images", "moving images", "favorites", and the like. However, the categories of the lists are not limited thereto. For example, the list may be any list that can be generated based on information which can be obtained and generated from information such as image analysis and image metadata, such as images in which a person appears, moving images over a specific number of seconds, and the like.

In step S306, the smart device 200 transmits an access point connection request for connecting to the wireless LAN network formed by the digital camera 100. The operations of step S305 are continued at this time. In the present embodiment, the smart device 200 cannot immediately recognize that the access point of the digital camera 100 for connecting to the wireless LAN network has been activated. As such, the smart device 200 establishes communication by transmitting the access point connection request after a set period of time has passed following the reception of a handover connection permission response in step S303. In the present embodiment, the digital camera 100 uses this time to generate the list of images in step S305 in advance.

In step S307, the digital camera 100 makes an access point connection permission response to the smart device 200, and establishes wireless LAN communication. Although the present embodiment describes an example in which the digital camera 100 and the smart device 200 perform wireless LAN communication through a handover request from a BLE connection, the configuration is not limited thereto. The simple AP may be activated by operating the operation unit 105 of the digital camera 100, without using a BLE connection.

In step S308, the smart device 200 requests an image list from the digital camera 100 to obtain the images to be displayed in the display unit 206. The "image list" is a list of images provided to the smart device 200 by the digital camera 100. The image list is generated based on cached data. For example, the image list includes the file paths and number of images provided to the smart device 200 by the digital camera 100. In step S309, the digital camera 100 transmits the image list generated in step S305. Generating the image list in step S305 makes it possible to respond to the request from the smart device 200 immediately.

Figure 3:
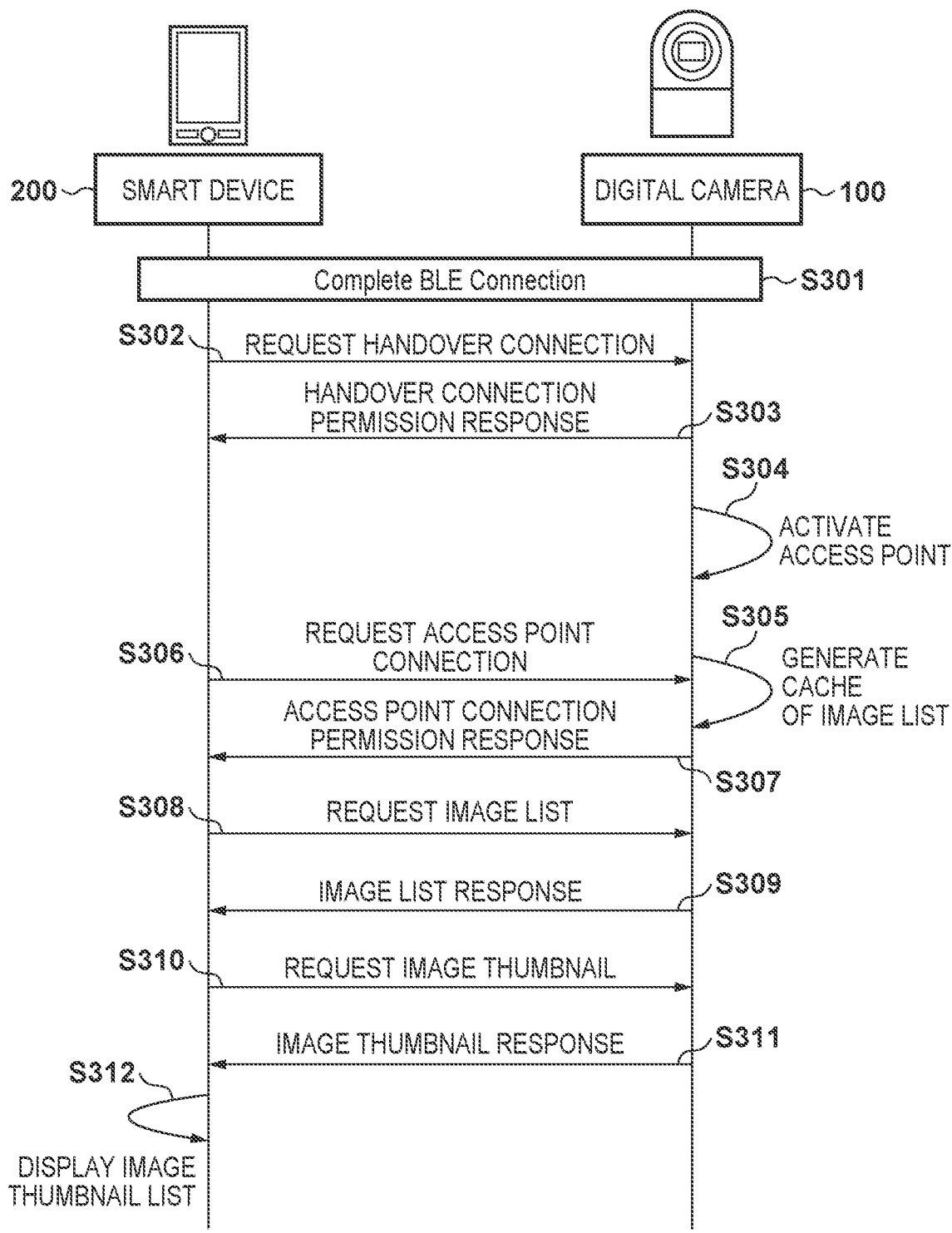
FIG. 3 is a sequence chart illustrating an example of processing carried out between the digital camera and the smart device according to the embodiment.
Figure 4A:
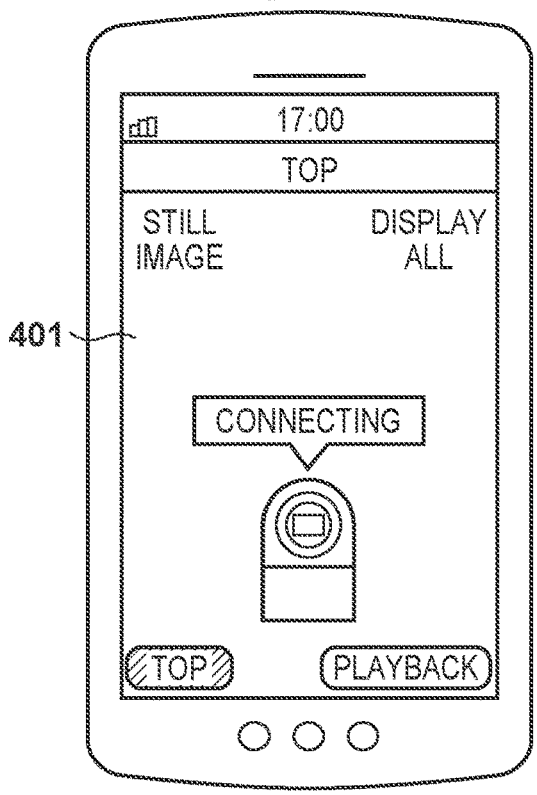
FIGS. 4A to 4D are diagrams illustrating examples of a user interface displayed in a smart device according to the embodiment.
Figure 4B:
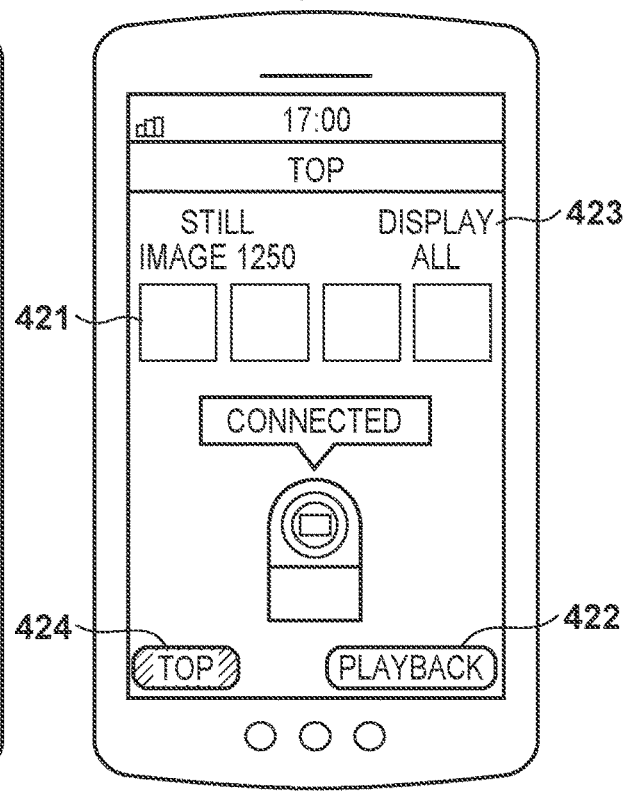

Note that in the example illustrated in FIG. 3, the response of step S307 is returned after the processing of step S305 is complete. To ensure that the list request in the following step S308 is responded to, it is preferable that the processing of step S307 be performed after step S305 is complete, but the sequence is not limited thereto. For example, if the load of the processing of step S305 is high, the response in step S307 may be returned without waiting for step S305 to be complete. Even in this case, the processing of step S305 is expected to be complete by the time the smart device connects to the access point and then requests the image list.

In step S310, the smart device 200 makes an image thumbnail obtainment request to the digital camera 100 using a file path recorded in the image list. In step S311, the digital camera 100 transmits the requested image thumbnail to the smart device 200. The thumbnails of the images displayed in the smart device 200 can be obtained by repeating steps S310 and S311. In step S312, the smart device 200 displays, in the display unit 206, a screen such as that illustrated in FIG. 4B. Images shot by the digital camera 100 are displayed in the smart device 200, as indicated by 421 in FIG. 4B, through the processing described above.

Series of Operations in Image Provision Processing by Digital Camera

Figure 5:
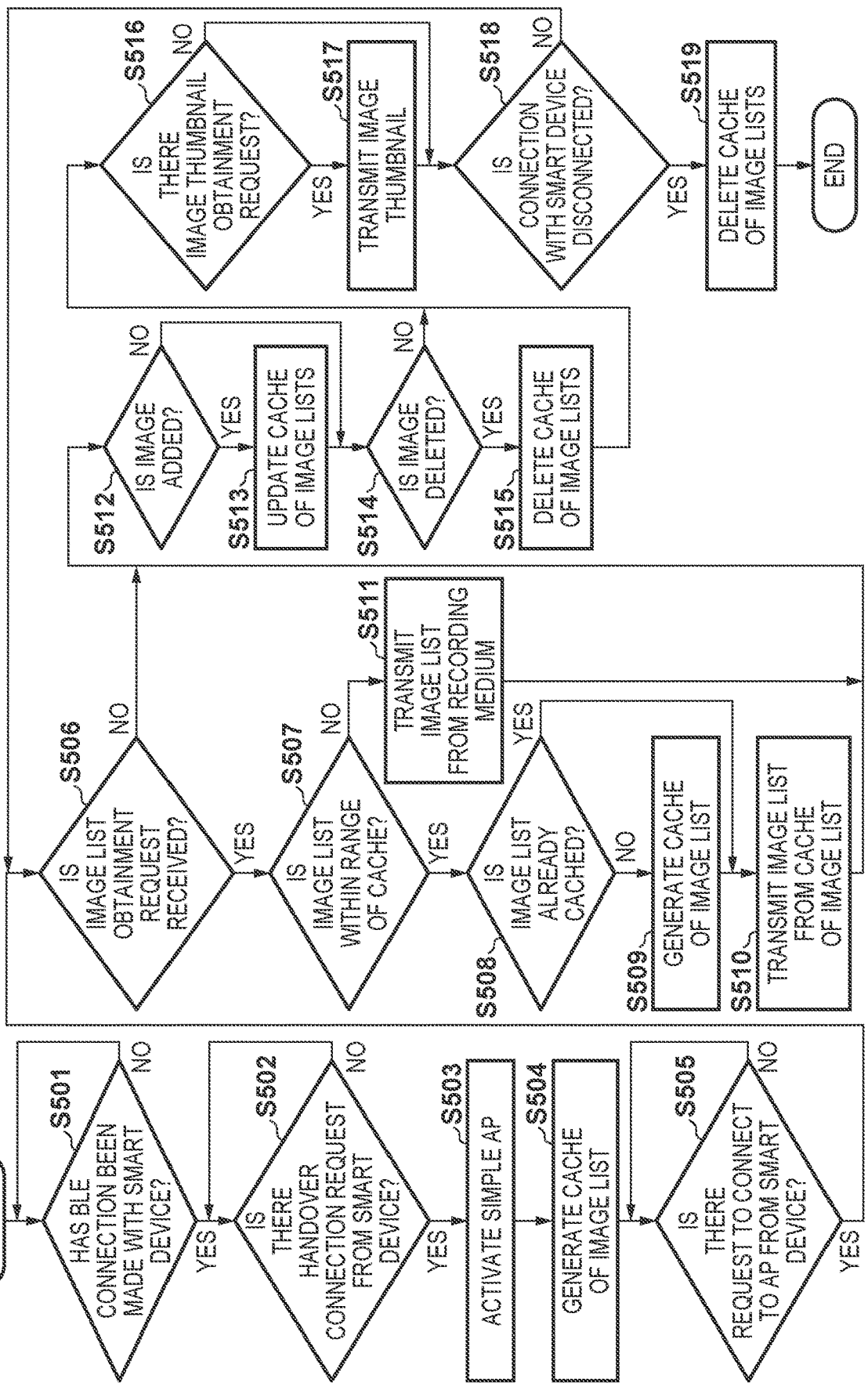
FIG. 5 is a flowchart illustrating a series of operations in image provision processing by the digital camera according to the embodiment.

A series of operations in image provision processing performed by the digital camera 100 will be described with reference to FIG. 5. Note that this processing can be realized by the control unit 101 of the digital camera 100 executing a program stored in the non-volatile memory 103 and controlling the operations of the respective constituent elements of the digital camera 100 as necessary. Additionally, this processing can be started when the digital camera 100 and the smart device 200 are in proximity at a predetermined distance at which a BLE connection can be made.

In step S501, the control unit 101 determines whether a BLE connection has been made with the smart device 200 through the short-range communication unit 112. The control unit 101 moves the processing to step S502 if a BLE connection with the smart device 200 is detected based on, for example, a notification from the short-range communication unit 112, and repeats the processing of step S501 if not.

In step S502, the control unit 101 determines whether the reception of a handover connection request from the smart device 200 through the short-range communication unit 112 has been detected. If it is determined that the reception of a handover connection request from the smart device 200 has been detected based on, for example, a notification from the short-range communication unit 112, the control unit 101 makes a response to the handover connection request to the smart device 200, and moves to step S503. However, if it is determined that the reception of a handover connection request has not been detected, the control unit 101 returns the processing to step S502.

In step S503, the control unit 101 activates the access point in the simple AP mode and forms a wireless LAN network to connect to the smart device 200 through the communication unit 111.

In step S504, the control unit 101 starts generating a cache of a list of images. For example, the control unit 101 selects images recorded in the recording medium 110, generates a list of images as a cache, and holds the generated image list cache in the working memory 104. As a caching method, the control unit 101 refers to image information to classify each image file recorded in the recording medium 110, and adds the information of the images to the image list cache according to the results of classifying the image information. For example, when a plurality of image lists, such as "still images", "moving images", "favorites", and the like, are present, each image list is constituted by the information of the images selected according to the type of the image (e.g., images for which metadata such as "still image", "moving image", or "favorite" has been added to the file). Detailed descriptions will be given later, but when an image list obtainment request designating any of the image lists is received, the control unit 101 transmits, to the smart device 200, the image list, among the plurality of image lists, that corresponds to that designation (e.g., "still images"). The control unit 101 holds the "still images", "moving images", and "favorites" lists in order from the newest shooting date/time, along with the number of images. An upper limit number is set in advance for each list, and no further images are added once that upper limit is reached. The capacity of the working memory 104 is limited, and this configuration therefore makes it possible to hold the images recorded in the recording medium 110 in the working memory 104 even when the number of images is high. This upper limit number is set to, for example, 100 in the present embodiment. Although the present embodiment describes caching the file paths and numbers of images for "still images", "moving images", and "favorites" displayed in the smart device 200, the configuration is not limited to this example. As described earlier, the list may be any list that can be generated based on information which can be obtained and generated from information such as image analysis and image metadata, such as images in which a person appears, moving images over a specific number of seconds, and the like. Additionally, the control unit 101 may cache only the "still image" image list for displaying the screen in FIG. 4B. Doing so eliminates the need to generate other image lists, which makes it possible to shorten the time required to generate the image list cache.

In step S505, the control unit 101 determines whether a request to connect to the access point activated by the digital camera 100 (i.e., the wireless LAN formed by the digital camera 100) has been received from the smart device 200 through the communication unit 111. If it is determined that a request to connect to the access point has been received from the smart device 200 based on, for example, a notification from the communication unit 111, the control unit 101 responds to the connection request and establishes a wireless LAN connection. The control unit 101 then moves the processing to step S506. However, if it is determined that a request to connect to the access point has not been received from the smart device 200, the control unit 101 returns the processing to step S505.

In step S506, the control unit 101 determines whether an image list obtainment request has been received from the smart device 200 through the communication unit 111. The control unit 101 moves the processing to step S507 if it is determined that an image list obtainment request has been received from the smart device 200 based on, for example, a notification from the communication unit 111, and moves the processing to step S512 if not. In the present embodiment, the control unit 101 uses "type of image list", "number to be obtained", and "number of image from which obtainment starts" as the content of the image list obtainment request, for example.

In step S507, the control unit 101 determines whether the requested image list is within the range of the cache according to the content of the obtainment request from the smart device 200. The control unit 101 moves the processing to step S508 if it is determined that the requested image list is within the range of the cache, and moves the processing to step S511 if not. Next, in step S508, the control unit 101 determines whether the image list is already cached, moves the processing to step S510 if it is determined that the requested image list is already cached, and moves the processing to step S509 if not.

The processing of step S507 (i.e., the processing of determining whether the requested images are within the range of the cache) will be described in further detail. A case where the digital camera 100 has cached 100 images for each of the "still images", "moving images", and "favorites" image lists will be described as an example. Additionally, it is assumed that the content of the image list obtainment request from the smart device 200 is "type of image list: still images", "number to be obtained: 100", and "number of image from which obtainment starts: 1". In this case, the control unit 101 determines that the image list in the obtainment request is within the range of the cache, and moves the processing to step S508. On the other hand, if the content of the image list obtainment request is "type of image list: still images", "number to be obtained: 200", and "number of image from which obtainment starts: 1", the control unit 101 determines that the image list pertaining to the obtainment request is outside the range of the cache. In this case, the control unit 101 moves the processing to step S511.

In step S509, the control unit 101 generates the image list in the same manner as in step S504. This is done to prevent a state in which the image list is not cached when the control unit 101 attempts to perform processing for clearing the cache (described later).

In step S510, the control unit 101 transmits the generated image list based on the cache (i.e., the image list retrieved from the cache) to the smart device 200 through the communication unit 111. In step S511, the control unit 101 generates an image list from the image files recorded in the recording medium 110 and transmits the generated image list to the smart device 200 through the communication unit 111.

In step S512, the control unit 101 determines whether an image has been captured by the image capturing unit 102 and an image file has been added. The control unit 101 moves the processing to step S513 if the addition of an image file is detected based on, for example, a notification from the image capturing unit 102 or the recording medium 110, and moves the processing to step S514 if not.

In step S513, the control unit 101 classifies the added image as "still image", "moving image", or "favorite" using the image information, and updates the respective image lists according to the result of the classification. As a method for performing the update, for example, the control unit 101 adds the added image to the image list if the number of images in the image list has not reached the upper limit. If the number of images in the image list has reached the upper limit, the control unit 101 deletes the image having the oldest shooting date/time from the image list and adds the added image to the image list. Doing so makes it possible to keep images having newer shooting dates/times in the image list.

In step S514, the control unit 101 determines whether an image has been deleted from the recording medium 110. For example, the control unit 101 moves the processing to step S515 if an image has been detected as having been deleted from the recording medium 110 based on a notification from the recording medium 110 or the like. In step S515, the control unit 101 clears the cache of the image lists held in the working memory 104. However, in the present embodiment, the control unit 101 does not generate a cache immediately after clearing the image list cache. This is because when images are deleted multiple times through user operations, if the control unit 101 generates a cache each time, the processing of generating the cache would be wasteful. In other words, when the image list cache is cleared, the control unit 101 starts generating the image list cache again in response to an image list obtainment request being received from the smart device 200.

In the present embodiment, the control unit 101 clears the cache by detecting the deletion of an image, but the clearing of the cache is not limited thereto. The control unit 101 may, based on the information of the image to be deleted, determine whether that image is included in the image list cache, before deleting the image. Then, if the image to be deleted is determined to be included in the image list cache, the control unit 101 may clear the image list cache. Doing so makes it possible to prevent the image list cache from being deleted despite an image not included in the cache being deleted. Additionally, if the image to be deleted is determined to be included in the image list cache, the control unit 101 may delete only that image from the image list cache. In this case, the control unit 101 may add the image having the most recent shooting date/time which is not held in the image list cache held in the recording medium 110 to the image list cache.

In step S516, the control unit 101 determines whether an image thumbnail obtainment request has been received from the smart device 200 through the communication unit 111. The control unit 101 moves the processing to step S517 if the reception of an image thumbnail obtainment request is detected based on, for example, a notification from the communication unit 111, and moves the processing to step S518 if not. In step S517, the control unit 101 transmits the thumbnail of an image to the smart device 200 through the communication unit 111 in response to the thumbnail obtainment request.

In step S518, the control unit 101 determines whether the wireless LAN connection with the smart device 200 through the short-range communication unit 111 has been disconnected. The control unit 101 moves the processing to step S519 if the wireless LAN connection with the smart device 200 is detected as having been disconnected based on a notification from the communication unit 111 or the like, and returns the processing to step S506 if not.

In step S519, the control unit 101 clears the cache of the image lists held in the working memory 104, after which the series of processing ends. Note that the clearing of the cache when the communication is disconnected may be performed through another method. For example, if the communication with the smart device 200 has changed from BLE communication to wireless LAN communication, the control unit 101 may skip clearing the image list cache if the BLE communication is being maintained, even if the wireless LAN communication is detected as having been disconnected. The control unit 101 may then clear the cache if the BLE communication is further disconnected.

In this manner, the control unit 101 starts generating the image list cache after a predetermined operation for establishing communication with the smart device 200 (e.g., activating an access point) is performed, but before an image list obtainment request is received from the smart device 200. Doing so makes it possible to generate the image list cache prior to the image list obtainment request from the smart device 200.

Additionally, when BLE communication and wireless LAN communication can be established with the external apparatus, there are cases where the smart device 200 transmits the access point connection request after a set period of time passes following the reception of the handover connection permission response, as described above. In this case, the control unit 101 can effectively use the time until the image list obtainment request is received from the smart device 200 (in step S506) to generate the cache. In the above-described example, the control unit 101 starts generating the image list cache in step S504 after activating the access point in simple AP mode in step S503. However, the control unit 101 is not limited to generating the cache after activating the access point, as long as the cache is generated before receiving the image list obtainment request from the smart device 200. For example, the generation of the cache may be started before the activating the access point, i.e., after receiving the request to hand over the communication with the smart device 200 to the wireless LAN communication (step S502). Alternatively, the control unit 101 may start generating the cache after receiving the connection request for performing wireless LAN communication using the access point (step S505).

The present embodiment has described an example in which the predetermined operation for establishing communication with the smart device 200 (e.g., activating an access point) is a predetermined operation for establishing communication used for providing an image to the smart device 200 (i.e., the wireless LAN). However, the stated predetermined operation may be an operation for establishing BLE communication. In other words, the generation of the cache may be started after establishing BLE communication.

Additionally, the present embodiment has described an example of starting the generation of the image list cache in response to an operation pertaining to the establishment of wireless LAN communication, which has a higher communication speed than BLE communication. However, the communication is not limited to wireless LAN communication, and may be another type of communication, as long as the communication is used to provide an image from the digital camera 100 to the smart device 200.

Series of Operations of Image Obtainment Processing by Smart Device

Figure 4C:
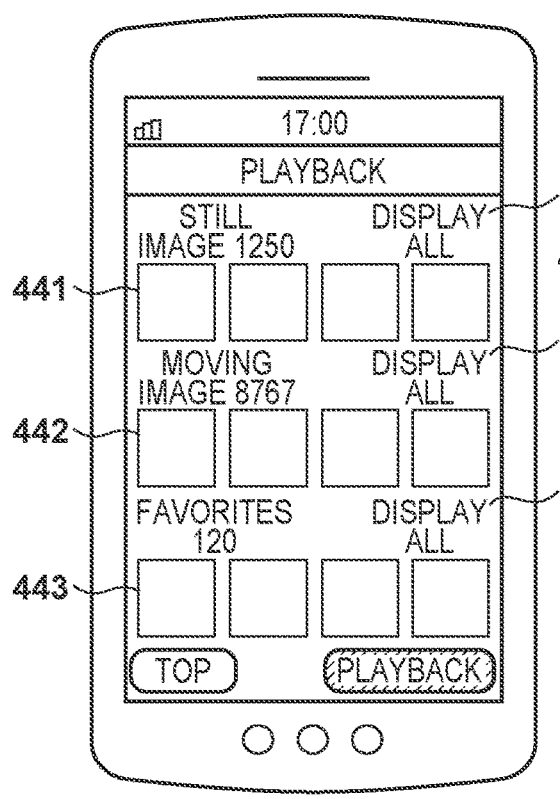
Figure 4D:
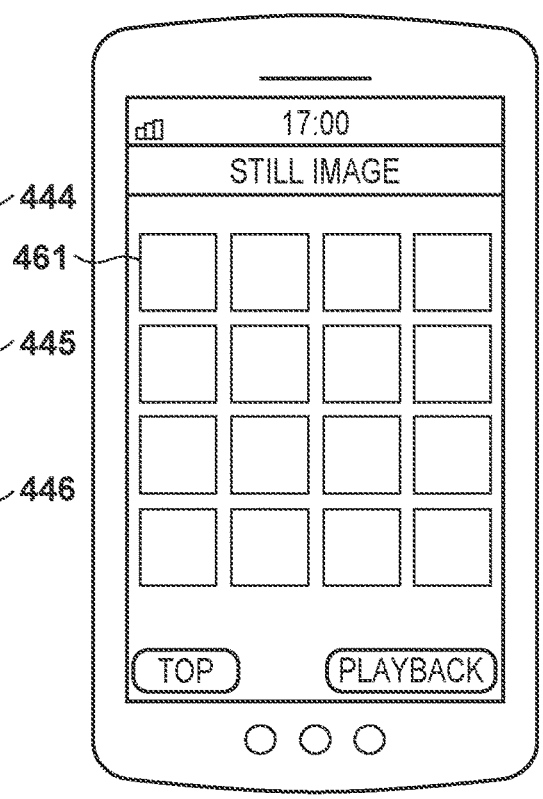

A series of operations in image obtainment processing performed by the smart device 200 will be described with reference to FIGS. 4A to 4D and FIG. 6. Note that this processing can be realized by the control unit 201 of the smart device 200 executing a program stored in the non-volatile memory 203 and controlling the operations of the respective constituent elements of the smart device 200 as necessary. Additionally, this processing can be started when the digital camera 100 and the smart device 200 are in proximity at a predetermined distance at which a BLE connection can be made. FIG. 4C illustrates an example of a UI in the smart device 200 for displaying some images shot by the digital camera 100. FIG. 4D illustrates an example of a UI in the smart device 200 for displaying all images shot by the digital camera 100.

In step S601, the control unit 201 determines whether a BLE connection has been made to the digital camera 100 through the short-range communication unit 212. The control unit 201 moves the processing to step S602 if a BLE connection with the digital camera 100 is detected based on, for example, a notification from the short-range communication unit 212, and repeats the processing of step S601 if not.

In step S602, the control unit 201 determines whether an operation for making a handover connection request has been input by the operation unit 205 being operated. The control unit 201 moves the processing to step S603 if an operation for making a handover connection request has been detected based on, for example, a notification from the operation unit 205 or the like, and moves the processing to step S602 if not. For example, the operation for making a handover connection request includes launching an application. The control unit 201 displays the UI illustrated in FIG. 4A in the display unit 206 in response to the application being launched.

In step S603, the control unit 201 transmits the handover connection request to the digital camera 100 through the short-range communication unit 212. Upon receiving a response to the handover connection request from the digital camera 100, the control unit 201 connects to the simple AP of the digital camera 100 through the communication unit 211 after a set period of time has passed. This makes it possible for the smart device 200 to join (connect to) the wireless LAN network formed by the digital camera 100. Note that in the present embodiment, the control unit 201 does not have a mechanism for detecting that the simple AP of the digital camera 100 has been activated, and therefore connects to the simple AP after waiting for the set period of time to pass. However, the present embodiment is not limited thereto. For example, if the smart device 200 has a mechanism for detecting that the simple AP has been activated, the control unit 201 may connect to the simple AP upon detecting that the simple AP has been activated. For example, the control unit 201 may detect the activation of the simple AP by receiving a notification from the digital camera 100 after the simple AP is activated, using the BLE connection. Alternatively, the control unit 201 may detect the activation of the simple AP by the smart device 200 periodically searching for a network formed by the digital camera 100 at regular intervals.

In step S604, the control unit 201 transmits a "still image" image list obtainment request to the digital camera 100 through the communication unit 211. The image list obtainment request includes the following information, for example: "type of image list: still images"; "number to be obtained: 100"; and "number of image from which obtainment starts: 1". This example assumes that an image list for the range held by the digital camera 100 is being requested. Accordingly, as described above, the digital camera 100 can return (transmit) the cached image list to the smart device 200.

In step S605, the control unit 201 obtains the file paths (and the number of images) from the image list obtained in step S604, through the communication unit 211. Using the obtained file paths, the control unit 201 transmits an image thumbnail obtainment request to the digital camera 100. The control unit 201 then obtains the thumbnails of the images pertaining to the obtainment request from the digital camera 100.

In step S606, the control unit 201 displays the list of images indicated in FIG. 4B in the display unit 206. The control unit 201 displays the image thumbnails and the number of images as the image list. A button 422 in FIG. 4B is a button for instructing a transition to a playback screen. In step S607, the control unit 201 determines whether the button 422 has been selected by the operation unit 205 being operated. The control unit 201 moves the processing to step S608 if the button 422 being selected has been detected based on a notification from the operation unit 205 or the like, and moves the processing to step S613 if not.

In step S608, the control unit 201 transmits a "still image" image list obtainment request to the digital camera 100 through the communication unit 211 in order to display the playback screen. The image list obtainment request includes the following information, for example: "type of image list: still images"; "number to be obtained: 100"; and "number of image from which obtainment starts: 1". This example assumes that an image list for the range held by the digital camera 100 is being requested. Accordingly, the digital camera 100 can return (transmit) the cached image list to the smart device 200. In the present embodiment, the control unit 201 makes the image list obtainment request in step S608 in the same manner as in step S604, but the present embodiment is not limited thereto. The image list obtained in step S604 may simply be reused.

In step S609, the control unit 201 transmits a "moving image" image list obtainment request to the digital camera 100 through the communication unit 211. The image list obtainment request includes the following information, for example: "type of image list: moving images"; "number to be obtained: 100"; and "number of image from which obtainment starts: 1". This example assumes that an image list for the range held by the digital camera 100 is being requested. Accordingly, the digital camera 100 can return (transmit) the cached image list.

In step S610, the control unit 201 transmits a "favorites" image list obtainment request to the digital camera 100 through the communication unit 211. The image list obtainment request includes the following information: "type of image list: favorites"; "number to be obtained: 100"; and "number of image from which obtainment starts: 1". It is assumed that an image list for the range held by the digital camera 100 is being requested. Accordingly, the digital camera 100 can return (transmit) the cached image list.

In step S611, the control unit 201 transmits an image thumbnail obtainment request to the digital camera 100 using the file paths in the image lists obtained in steps S608 to S610, and obtains the image thumbnails.

In step S612, the control unit 201 makes the display illustrated in FIG. 4C in the display unit 206. The control unit 201 displays the image thumbnails and the number of images as the image list. FIG. 4C illustrates a screen of the application, and an area 441 in FIG. 4C indicates the display of still images shot by the digital camera 100. The control unit 201 displays a list and the number of the still images obtained in steps S608 and S611 in the area 441. An area 442 in FIG. 4C displays moving images shot by the digital camera 100. The control unit 201 displays a list and the number of the moving images obtained in steps S609 and S611 in the area 442. An area 443 in FIG. 4C displays favorite images shot by the digital camera 100. The control unit 201 displays a list and the number of the favorite images obtained in steps S610 and S611 in the area 443.

Although the present embodiment described obtaining the image thumbnails after obtaining the image list in steps S608 to S610, the embodiment is not limited thereto. The control unit 201 may obtain and display the image thumbnails each time an image list is obtained in each of steps S608, S609, and S610.

A button 423 in FIG. 4B is a button for instructing a transition to a screen in which all of the still images recorded in the recording medium 110 of the digital camera 100 are displayed. In step S613, the control unit 201 determines whether the button 423 has been selected by the operation unit 205 being operated. The control unit 201 moves the processing to step S614 if it is detected that the button 423 has been selected, and moves the processing to step S617 if not.

In step S614, the control unit 201 transmits an image list obtainment request to the digital camera 100 through the communication unit 211. The image list obtainment request includes the following information, for example: "type of image list: still images"; "number to be obtained: all"; and "number of image from which obtainment starts: 1". If there are more than 100 still images recorded in the recording medium 110 of the digital camera 100, the number exceeds the range of the cache held by the digital camera 100 in the present embodiment, and the digital camera 100 therefore generates an image list from the recording medium 110.

In step S615, the control unit 201 transmits an image thumbnail obtainment request to the digital camera 100 using the file paths in the image list obtained in step S614, and obtains the image thumbnails, through the communication unit 211.

In step S616, the control unit 201 makes the display illustrated in FIG. 4D in the display unit 206. FIG. 4D illustrates a screen of the application, and an area 461 in FIG. 4D indicates an area for displaying still images shot by the digital camera 100. In this manner, images can be displayed rapidly in the screens illustrated in FIGS. 4B and 4C, whereas all the images held by the digital camera 100 can be displayed in the screen illustrated in FIG. 4D.

A button 444 in FIG. 4C is a button for instructing a transition to a screen in which all of the still images recorded in the recording medium 110 of the digital camera 100 are displayed. When the button 444 is pressed, the control unit 201 may perform similar processing as that performed when the button 423 described earlier is pressed. Additionally, a button 445 and a button 446 in FIG. 4C are buttons for instructing transitions to a screen for displaying all the moving images and a screen for displaying all the favorite images, respectively. Although the types of image lists requested from the digital camera 100 are different, the other processing is similar to the processing performed when displaying all the still images.

A button 424 in FIG. 4B is a button for instructing a transition to a top screen display when the application is launched. In step S617, the control unit 201 determines whether the button 424 has been selected by the operation unit 205 being operated. The control unit 201 moves the processing to step S618 if it is detected that the button 424 has been selected, and moves the processing to step S621 if not. Thereafter, the control unit 201 executes the processing from steps S618 to S620 in the same manner as the aforementioned steps S604 to S606.

In step S621, the control unit 201 determines whether the wireless LAN connection with the digital camera 100 through the communication unit 211 has been disconnected. The control unit 201 ends this series of operations if it is detected that the wireless LAN connection has been disconnected based on, for example, a notification from the communication unit 211 or the like, and returns the processing to step S607 if not.

As described thus far, according to the present embodiment, the control unit 101 starts generating the image list cache after a predetermined operation for establishing communication with the smart device 200 (e.g., activating an access point) is performed, but before an image list obtainment request is received from the smart device 200. Doing so makes it possible to generate the image list cache prior to the image list obtainment request from the smart device 200. In other words, it is possible to provide a rapid response to a request from the smart device 200 for information provided by the digital camera 100.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-044385, filed Mar. 18, 2022, which is hereby incorporated by reference herein in its entirety.

What is claimed is:

1. An electronic apparatus comprising:
a communication interface configured to communicate with an external apparatus;
one or more processors; and
a memory storing instructions which, when the instructions are executed by the one or more processors, cause the electronic apparatus to function as:
a generation unit configured to generate an image list indicating images to be provided to the external apparatus; and
a control unit configured to perform control such that the image list is transmitted to the external apparatus in a case where an obtainment request for the image list is received from the external apparatus,
wherein the control unit starts generating a cache of the image list after a predetermined operation pertaining to establishing communication with the external apparatus is made and before receiving the obtainment request for the image list from the external apparatus, and transmits the image list based on the cache to the external apparatus in response to receiving the obtainment request for the image list.

2. The electronic apparatus according to claim 1,
wherein the control unit starts generating the cache of the image list in accordance with the predetermined operation pertaining to establishing communication used to provide images to the external apparatus.

3. The electronic apparatus according to claim 1,
wherein the generation unit generates a plurality of image lists, each of the image lists being a list of images selected by image type, and
in response to receiving, from the external apparatus, an obtainment request for an image list including a designation of a list, the control unit transmits, to the external apparatus, an image list, among the plurality of image lists, that corresponds to the designation.

4. The electronic apparatus according to claim 3, further comprising:
an image capturing unit configured to capture an image; and
a classifying unit configured to, based on image information of the image captured, classify the image,
wherein the control unit adds information of the image to a cache of an image list, among the plurality of image lists, corresponding to a result of classifying the image.

5. The electronic apparatus according to claim 1, further comprising:
a deleting unit configured to delete an image stored in a storage unit,
wherein the control unit clears the cache of the image list in a case where a predetermined image has been deleted by the deleting unit.

6. The electronic apparatus according to claim 5,
wherein the control unit skips clearing the cache of the image list in a case where information of the image deleted by the deleting unit is not included in the cache of the image list.

7. The electronic apparatus according to claim 5,
wherein in a case where the cache of the image list has been cleared, the control unit starts generating the cache of the image list in response to the obtainment request for the image list being received from the external apparatus, and transmits, to the external apparatus, the image list based on the cache.

8. The electronic apparatus according to claim 1,
wherein the communication interface is capable of establishing first communication and second communication with the external apparatus, the second communication having a higher communication speed than the first communication and being used to provide images to the external apparatus, and
the control unit skips generating the cache of the image list when the first communication is established with the external apparatus.

9. The electronic apparatus according to claim 8,
wherein the predetermined operation pertaining to establishment of communication includes one of (i) receiving a request to hand over the communication with the external apparatus from the first communication to the second communication, (ii) activating an access point for the second communication, or (iii) receiving a connection request for performing the second communication using the access point.

10. The electronic apparatus according to claim 1,
wherein the communication interface is capable of establishing first communication and second communication with the external apparatus, the second communication having a higher communication speed than the first communication and being used to provide images to the external apparatus, and
the control unit starts generating the cache of the image list in response to the predetermined operation pertaining to establishment of communication with the external apparatus that changes the communication from the first communication to the second communication.

11. The electronic apparatus according to claim 1,
wherein the control unit clears the cache of the image list in response to detecting the communication used for providing images to the external apparatus being disconnected.

12. The electronic apparatus according to claim 1,
wherein the communication interface is capable of establishing first communication and second communication with the external apparatus, the second communication having a higher communication speed than the first communication and being used to provide images to the external apparatus, and
in a case where the communication with the external apparatus is changed from the first communication to the second communication, the control unit skips clearing the cache of the image list even in a case where the second communication is detected as being disconnected.

13. A method of controlling an electronic apparatus that includes a communication interface configured to communicate with an external apparatus and a generation unit configured to generate an image list indicating images to be provided to the external apparatus, the method comprising:
starting generation of a cache of the image list after a predetermined operation pertaining to establishing communication with the external apparatus is made and before receiving an obtainment request for the image list from the external apparatus; and
performing control to transmit the image list based on the cache to the external apparatus in response to the obtainment request for the image list being received from the external apparatus.

14. A non-transitory computer-readable storage medium comprising instructions for performing the method of controlling an electronic apparatus that includes a communication interface configured to communicate with an external apparatus and a generation unit configured to generate an image list indicating images to be provided to the external apparatus, the method comprising:

starting generation of a cache of the image list after a predetermined operation pertaining to establishing communication with the external apparatus is made and before receiving an obtainment request for the image list from the external apparatus; and performing control to transmit the image list based on the cache to the external apparatus in response to the obtainment request for the image list being received from the external apparatus.

\* \* \* \* \*